United States Patent [19]

Shaw

[11] Patent Number: 5,726,368
[45] Date of Patent: Mar. 10, 1998

[54] SING-ALONG PIANO BAR

[76] Inventor: William Fred Shaw, 42242 Omar Pl., Palm Desert, Calif. 92211

[21] Appl. No.: 575,621

[22] Filed: Dec. 20, 1995

[51] Int. Cl.[6] ........................................ G10C 3/00
[52] U.S. Cl. ...................... 84/190; 84/180; 84/181; 84/453; 280/35
[58] Field of Search ........................ 84/180–181, 190, 84/327, 453, 232; 211/88, 90; 248/129, 443; 224/910; 280/35; 312/140.1, 140.2

[56] References Cited

U.S. PATENT DOCUMENTS

| D. 56,295 | 9/1920 | McConnell | D17/8 |
|---|---|---|---|
| D. 132,541 | 5/1942 | Cushing | D17/7 |
| D. 270,692 | 9/1983 | Somers . | |
| D. 294,438 | 3/1988 | Pag'' . | |
| 920,747 | 5/1909 | Hughes . | |
| 1,887,067 | 11/1932 | Pehrsson | 280/35 |
| 2,016,097 | 10/1935 | Parsons . | |
| 2,680,523 | 6/1954 | Heeter . | |
| 4,220,347 | 9/1980 | Huntington . | |
| 4,570,803 | 2/1986 | Peterson . | |
| 4,893,363 | 1/1990 | Huff . | |
| 5,267,715 | 12/1993 | Owen . | |
| 5,387,074 | 2/1995 | Brown . | |

FOREIGN PATENT DOCUMENTS

| 488 388 | 12/1929 | Germany . |
|---|---|---|
| 303399 | 1/1929 | United Kingdom . |

*Primary Examiner*—William M. Shoop, Jr.
*Assistant Examiner*—Marlon Fletcher
*Attorney, Agent, or Firm*—Richard C. Litman

[57] ABSTRACT

An accessory kit for use with a piano of the grand or baby-grand type. The accessory kit includes a dolly which can support a piano in addition to supporting a footrest railing in a surrounding relationship to the legs of the piano, and a removable counter top or bar that can be mounted to the sound box of the piano. With the accessory kit patrons can sit around the piano and sing along while consuming their drinks and food in comfort.

15 Claims, 3 Drawing Sheets

SING-ALONG PIANO BAR

BACKGROUND OF THE INVENTION

1. Field of the Invention

The present invention relates to an accessory kit for use with pianos. More particularly, the present invention includes a dolly which can support a piano in addition to supporting a footrest railing in a surrounding relationship to the legs of the piano, and a removable counter top or bar that can be mounted to the sound box of the piano.

2. Description of the Prior Art

Pianos are commonly used in homes, bars, and lounges to entertain patrons or guests. It is customary for guests or patrons to gather around the piano and sing along with the music being played on the piano. At such times guests or patrons have to bear the physical burden of constantly holding their food or drink in their hand because there is no convenient place around the piano on which they can rest their food or drink. In addition, there is no place for the guests or patrons to rest their feet when standing or sitting around the piano. Therefore, a need exists for an accessory kit usable with an existing piano that provides a convenient structure on which people can rest their food, drinks, and body parts. None of the prior art is seen to provide an accessory kit for use with a piano which provides a counter top and a footrest around the perimeter of a piano, and which can be applied to a preexisting piano without any modification to the piano.

U.S. Pat. No. 920,747, issued May 4, 1909 to Hughes, shows a shelf that can be hung on the rim of a barrel. Hughes does not show the contour of the counter top of the present invention.

U.S. Pat. No. 2,061,097, issued Oct. 1, 1935 to Parsons, shows a serving tray that can be hung on the door of an automobile. Parsons does not show the contour of the counter top of the present invention.

U.S. Pat. No. 2,680,523, issued Jun. 8, 1954 to Heeter, shows a serving tray that can be hung on the back of the seat of an automobile. Heeter does not show the contour of the counter top of the present invention.

U.S. Pat. No. 4,220,347, issued Sep. 2, 1980 to Huntington, shows a safety piano dolly. Huntington does not show a dolly having a footrest.

U.S. Pat. No. 4,570,803, issued Feb. 18, 1986 to Peterson, shows a serving tray that can be hung on the edge of a balcony. Peterson does not show the contour of the counter top of the present invention.

U.S. Pat. No. 4,893,363, issued Jan. 16, 1990 to Huff, shows a table that can be hung on the edge of a swimming pool. Huff does not show the contour of the counter top of the present invention.

U.S. Pat. No. 5,267,715, issued Dec. 7, 1993 to Owen, shows a shelf that can be hung on the edge of a patio. Owen does not show the contour of the counter top of the present invention.

U.S. Pat. No. 5,387,074, issued Feb. 7, 1995 to Brown, shows a piano dolly and lift for moving a piano. Brown does not show a dolly having a footrest.

U.S. Pat. No. Des. 270,692, issued Sep. 27, 1983 to Somers, shows a combined coffee table and foot rail. Somers does not show the contour of the counter top of the present invention.

U.S. Pat. No. Des. 294,438, issued Mar. 1, 1988 to Pagé, shows a combined piano and table. Pagé does not show a kit usable with a preexisting piano. In addition, Pagé does not show a dolly having a footrest.

German Patent Document Number 488 388, dated Dec. 12, 1929 by Mühle, shows a sheet music holder for a piano. Mühle does not show a counter top or footrest for use with a piano.

U.K. Patent Document Number 303,399, dated Jan. 2, 1929 by Waddington & Sons, shows a piano with drawers. Waddington & Sons does not show a counter top or footrest for use with a piano.

None of the above inventions and patents, taken either singly or in combination, is seen to describe the instant invention as claimed.

SUMMARY OF THE INVENTION

The present invention is directed to an accessory kit for use with a piano which provides a counter top and a footrest around the perimeter of a piano so that persons sitting or gathering around the piano have a convenient place to rest their food and drinks, and a convenient structure to rest their feet on.

Accordingly, it is a principal object of the invention to provide a piano bar that allows persons who gather around a piano to have a convenient place to rest their food and drinks.

It is another object of the invention to provide a dolly for supporting a piano which provides a convenient structure for people to rest their feet upon when sitting around the piano.

It is a further object of the invention to provide an accessory kit which replicates a bar around the perimeter of a piano.

Still another object of the invention is to provide an accessory kit for a piano which can be used without modification or damage to the piano.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
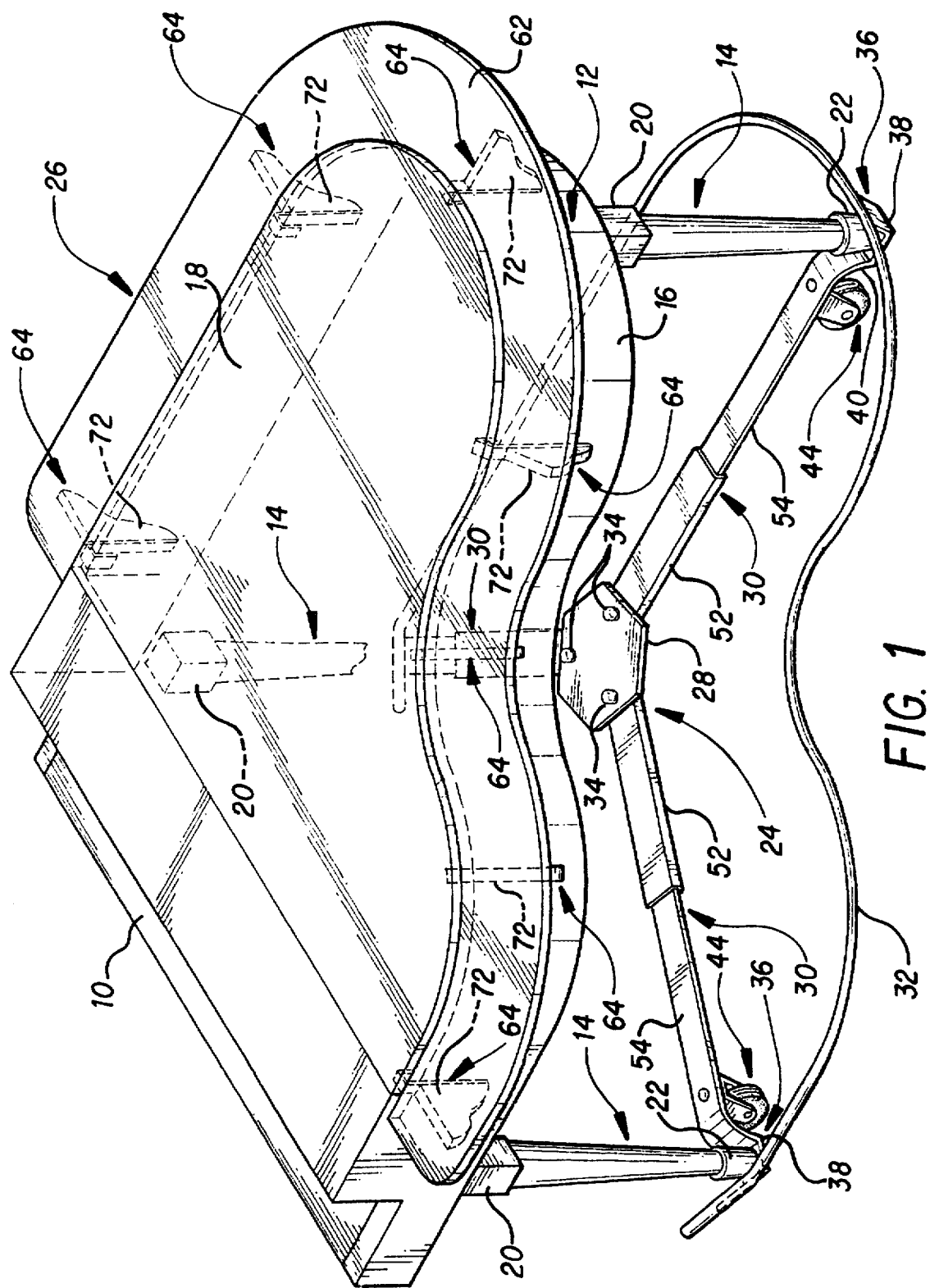
FIG. 1 is an environmental perspective of the dolly and piano bar of the present invention
Figure 2:
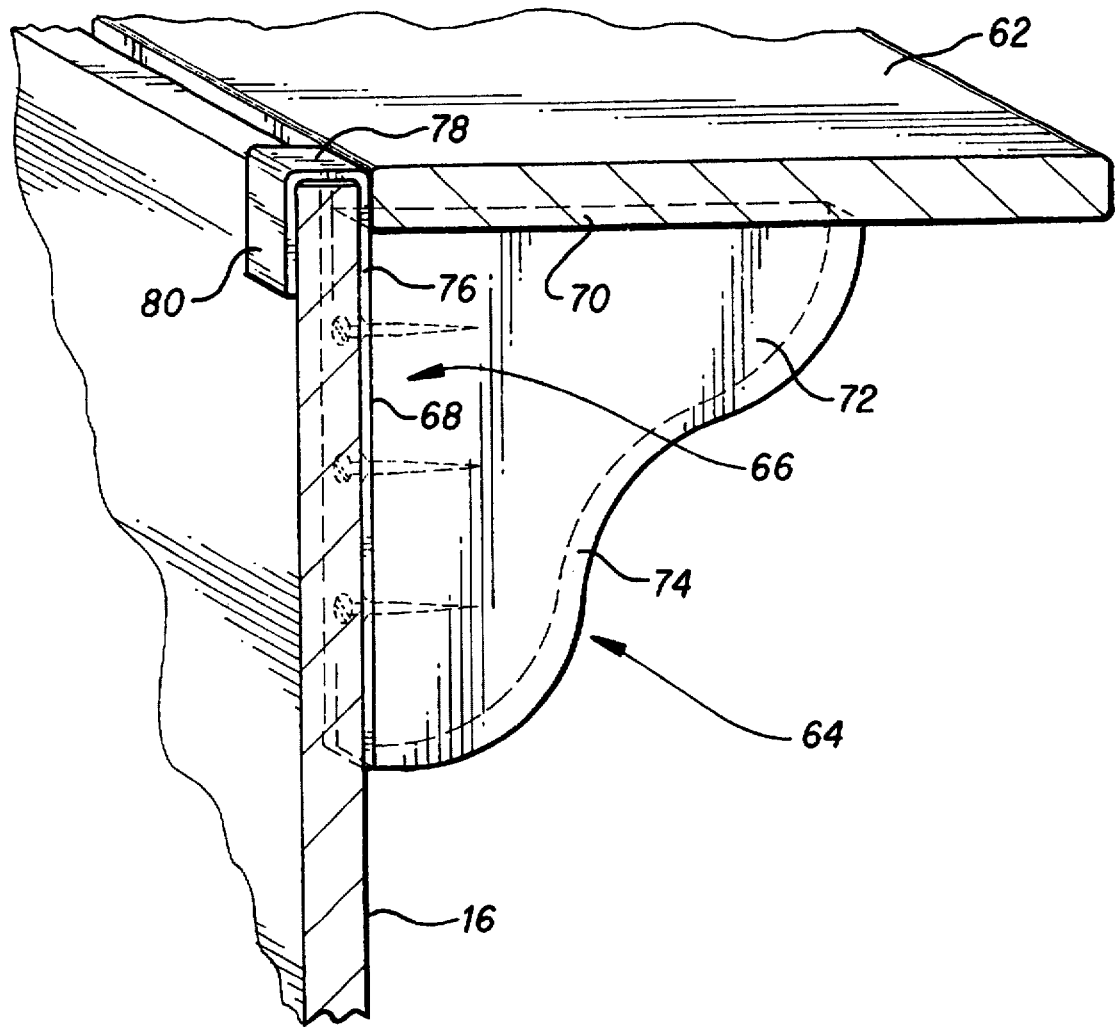
FIG. 2 is a fragmentary view showing details of the piano bar of the present invention, showing in particular the arrangement of the counter top, the braces, and the hanging brackets.
Figure 3:
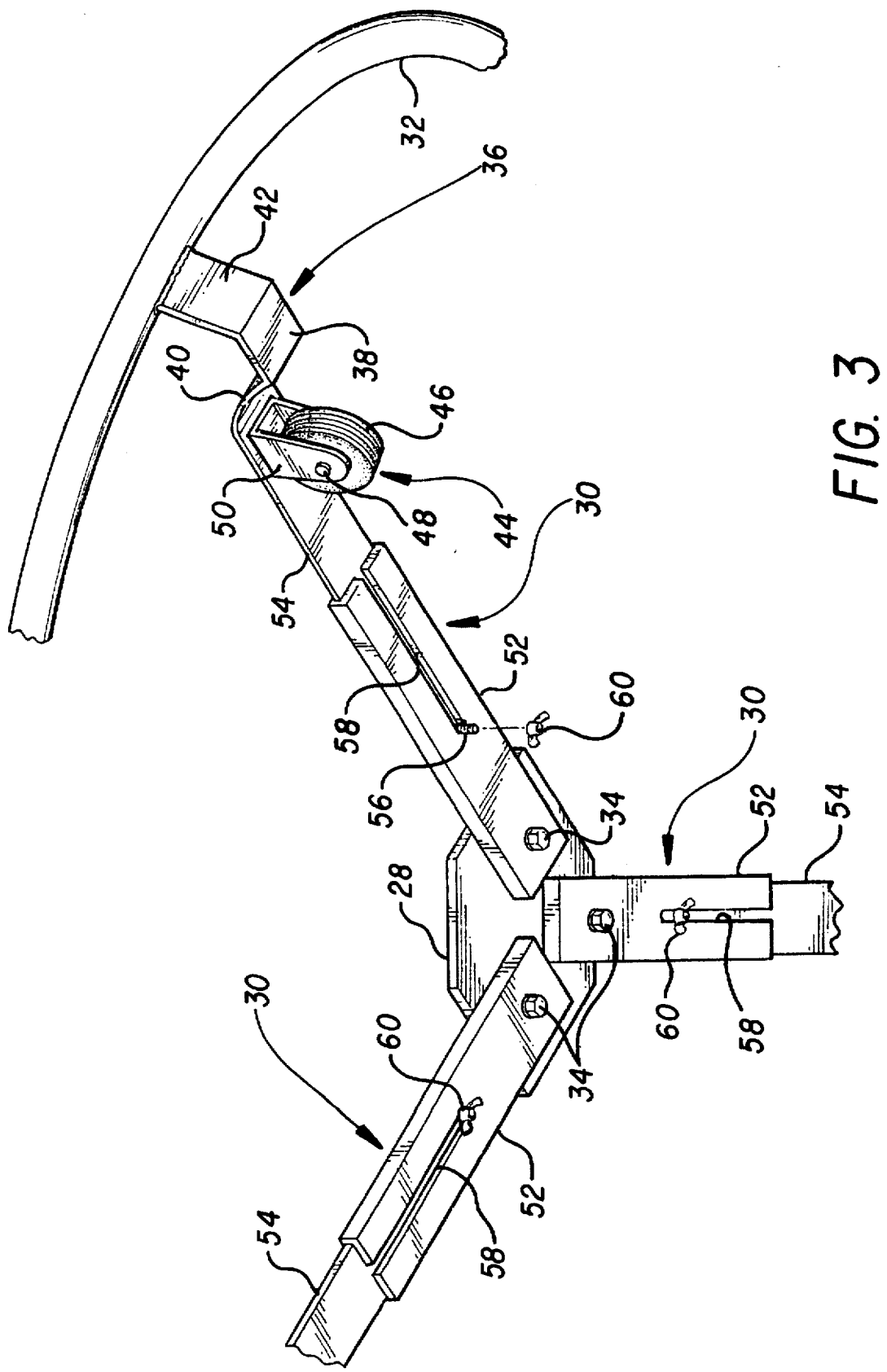
FIG. 3 is a fragmentary bottom perspective view of the dolly of the present invention showing details of the arms of the dolly.

The present invention is directed to an accessory kit for use with pianos of the grand or baby-grand type. Such pianos generally have a keyboard 10 (shown schematically), a sound box 12, and legs 14. The sound box 12 houses the wires (not shown) that generate the piano's sound. The piano's sound box 12 has a characteristic contour or plan-form which resembles a harp. The sound box 12 also has a vertical wall 16 which follows the characteristic contour of the sound box. The top of the sound box 12 is open and a hinged cover 18 is provided for the sound box. The hinged cover 18 can be propped open by a rod (not shown). When the hinged cover is open the top rim of the vertical wall 16 of the piano is exposed.

Each of the plurality of legs 14 has a top end 20 that is attached to the bottom of the sound box 12. Each of the legs 14 also has and a bottom end or tip 22 which is normally provided with wheels or casters (not shown). The casters normally provided at the leg tips 22 are generally easily removable and once removed leave the leg tips 22 in an unobstructed configuration.

Referring to the drawings, the accessory kit itself includes a dolly 24 and a piano bar 26. The dolly 24 includes a hub 28, a plurality of arms 30, and a footrest railing 32. The arms 30 correspond in number to the legs 14 of the piano. Each of the arms 30 is attached at one end to the hub 28 by a nut and bolt 34, and extends radially from the hub 28. The arms 30 lie generally in the same plane, the top side of this plane ordinarily facing the bottom of the sound box 12 and the bottom side of this plane ordinarily facing the floor.

At the other end of each arm 30 is a receiving means 36 for receiving the tip 22 of a respective one of the piano legs Each receiving means 36 has a bottom 38 upon which the respective leg tip 22 rests when the dolly 24 is being used to support a piano. The bottoms 38 are positioned below the plane of the arms 30 such that when a piano is placed on the dolly 24 with the leg tips 22 positioned within the receiving means 36, relative movement between the piano and the dolly will be prevented as the piano is pushed along on the dolly. The bottoms 38 are fixed to the ends of the arms 30 by first sidewalls 40. Second sidewalls 42 extend from each bottom 38 to the footrest railing 32 and support the footrest railing in place.

The footrest railing 32 surrounds the legs 14 when a piano is placed on the dolly 24, and the footrest railing is shaped to essentially follow the characteristic contour of the sound box 12 of the piano. As was mentioned previously, the footrest railing 32 is simultaneously attached to and supported by the second sidewalls 42 of the receiving means 36. When the piano is being supported by the dolly 24 with the tip 22 of each leg 14 being received by the respective receiving means 36, persons sitting around the piano are thus able to rest their feet on the footrest railing 32.

Casters 44 are attached to each arm 30 adjacent each receiving means 36 to allow the dolly 24 to roll on the floor. The casters 44 project from the bottom side of the plane of the arms 30 and have a height greater than the depth of the receiving means 36 so that only the casters contact the floor. The casters 44 are conventional in design and will not be discussed in great detail. Each caster 44 includes a wheel 46 supported by an axle 48. Usually ball bearing (not shown) are provided between the wheels 46 and the axles 48 to allow the wheels to rotate freely about the axles. The axle of each wheel 46 is in turn supported by a fork 50 which is itself attached to a respective one of the arms 30. The casters 44 are normally attached to the arms 30 in a manner such that they are free to swivel about a vertical axis. In this way, the dolly can roll in any desired direction. Also, as with other conventional casters, the casters 44 have brakes (not shown) provided at the hub of each wheel 46 to prevent the dolly 24 and the piano thereon to roll around uncontrollably once the dolly and piano are placed in a desired location.

The arms 30 are preferably of the telescoping kind to allow adjustment of the length of the arms. In the preferred embodiment, each of the arms 30 includes a first portion 52 and a second portion 54. The second portion 54 is slidably supported by the first portion 52. The second portion 54 has a stud 56 fixed thereto. The first portion 52 has a slot 58 along its bottom. The slot 58 accommodates the stud 56 allowing the stud 56 to pass through it and project from the bottom of the first portion 52. Naturally, as second portion 54 is slidably moved relative to the first portion 52, the stud 56 will move along the slot 58. A wing nut 60 threadably engages the stud 56. The wing nut 60 is tightened on to the stud 56 to fix the second portion 54 relative to the first portion 52 once the arm 30 reaches the desired length. The footrest railing 32 is then attached to the second sidewalls 42 of the receiving means 36 by any well known method such as welding.

The piano bar 26 includes a counter top 62, a plurality of braces 64, and hanging brackets 66. The counter top 62 is in the form of a strip having a predetermined width. The strip follows the outside contour of the sound box 12 of the piano when viewed from above, i.e. in plan view.

Each of the braces 64 each has a back surface 68 and a top surface 70 perpendicular to the back surface 68. Each of the braces 64 is attached to the bottom surface of the counter top 62 with the top surface 70 flush against the bottom of the counter top. Each brace 64 is in the form of a slab having a pair of parallel spaced apart lateral surfaces 72. The top surface 70 and the back surface 68 extend between the lateral surfaces 72. Also extending between the lateral surfaces 72, and extending from the top surface 70 to the back surface 68, is a front surface 74. Preferably, the front surface 74 is ornamented in an aesthetically pleasing manner by for example cutting the profile of the front surface 74 in an ornamental motif.

Each brace 64 has a hanging bracket 66 attached to its back surface 68. Each hanging bracket 66 has a first bracket portion 76 which is attached to the back surface 68 of the respective brace 64. The first bracket portion 76 is shaped to cover the entire back surface 68 and extend past the intersection of the back surface 68 and the top surface 70 of the brace 64. A second bracket portion 78 extends perpendicularly from the first bracket portion 76 and is attached to the end of the first bracket portion 76 closest to the counter top 62. The second bracket portion 78 extends in a direction directly away from the counter top 62. Extending from the second bracket portion 78, in a direction parallel to the first bracket portion 76 and on the same side of the second bracket portion 78 as the first bracket portion 76, is a third bracket portion 80. The third bracket portion 80 is attached to the end of the second bracket portion 78 distal from the first bracket portion 76. The first bracket portion 76, the second bracket portion 78, and the third bracket portion 80 cooperatively form an upside down, angular J-shaped structure that can be hooked over the top rim of vertical wall 16 of the sound box 12 of the piano. Thus, the piano bar 26 can be removably hung on to the vertical wall 16 of the sound box 12 of the piano when the hanging brackets 66 are hooked to the top rim of the vertical wall 16 after having opened the hinged cover 18. The piano bar 26 then forms a counter top along the outside periphery of the piano allowing guests or patrons to rest their food, drinks, elbows, etc., on the counter top. The braces 64 distribute the torque due to the weight of the counter top 62 and due to the weight of the items on the counter top along the outside surface of the vertical wall 16, thus giving greater stability and strength to the counter top 62. The hanging brackets 66 are preferably made of relatively thin sheet metal, thus allowing the hinged cover 18 to be in the open or closed position with the piano bar 26 in place.

In use the piano is placed on the dolly 24 and the piano bar 26 is hung on to the sound box 12. This arrangement replicates a conventional bar around the outside perimeter of the piano. Guests or patrons can then pull up their bar stools to the piano and, while sitting on their bar stools, rest their feet on the footrest railing 32 and place their food, drinks, elbows, etc., on the counter top 62. Thus, the guests or patrons can gather around the piano and sing along with the music being played on the piano by a person sitting at the keyboard 10, while enjoying their food and drinks without having to constantly hold their food and drinks in their hands.

It is to be understood that the present invention is not limited to the sole embodiment described above, but encompasses any and all embodiments within the scope of the following claims.

I claim:

1. A dolly for supporting a piano having a sound box with a characteristic contour and having a plurality of legs, each of the plurality of legs having a bottom end, said dolly comprising:

a hub;

a plurality of arms corresponding in number to the plurality of legs, each of said plurality of arms having a first end and a second end, each of said plurality of arms being attached to said hub at said first end thereof;

a plurality of receiving means for receiving the bottom end of a respective one of the plurality of legs, said plurality of receiving means corresponding in number to said plurality of arms, each of said plurality of receiving means includes a bottom having a first end and a second end, a first sidewall connecting said second end of a respective one of said plurality of arms to said first end of said bottom, and a second sidewall attached to said second end of said bottom;

a plurality of casters each being attached to a respective one of said plurality of arms; and a footrest railing supported by said plurality of receiving means and attached to each said second sidewall.

2. The dolly according to claim 1, wherein said footrest railing being shaped to essentially correspond to the characteristic contour of the sound box of the piano.

3. The dolly according to claim 1, wherein each of said plurality of arms includes:

a first portion having a slot;

a second portion being slidably supported by said first portion, said second portion having a stud attached thereto, said stud passing through said slot in said first portion; and a wing nut threadably engaged to said stud.

4. A piano bar for use with a piano having a sound box with a characteristic contour, the sound box also having a vertical wall following the characteristic contour, the vertical wall having a top, said piano bar comprising:

a counter top having a top surface and a bottom surface, said counter top having a substantially constant width around the sound box of the piano and a shape substantially corresponding to the characteristic contour of the sound box of the piano;

a plurality of braces each having a back surface and a top surface perpendicular to said back surface thereof, each of said plurality of braces being attached to said bottom surface of said counter top along said top surface of each of said plurality of braces; and a plurality of brackets corresponding in number to said plurality of braces, each of said plurality of brackets being attached to a respective one of said plurality of braces at said back surface thereof, each of said plurality of brackets being dimensioned and configured to hook around the top of the vertical wall, whereby said piano bar is removably mounted to the vertical wall of the sound box of the piano.

5. The piano bar according to claim 4, wherein each of said plurality of brackets comprises:

a first bracket portion attached to said back surface of a respective one of said plurality of braces;

a second bracket portion extending perpendicularly from said first bracket portion from an end of said first bracket portion proximate said counter top in a direction opposite said counter top; and a third bracket portion extending from said second bracket portion at an end thereof distal from said first bracket portion in a direction parallel to said first bracket portion and away from said counter top.

6. The piano bar according to claim 4, wherein each of said plurality of braces has a pair of parallel surfaces on either side of said top and said back surface thereof, and an ornamented front surface extending from said top surface to said back surface thereof.

7. An accessory kit for use with a piano having a plurality of legs, each of the plurality of legs having a top end and a bottom end, the piano also having a sound box with a characteristic contour, the sound box also having a vertical wall following the characteristic contour, the vertical wall having a top, an inside, and an outside, said accessory kit comprising:

a dolly for supporting the piano, said dolly including a hub, a plurality of arms corresponding in number to the plurality of legs, each of said plurality of arms having a first end and a second end, each of said plurality of arms being attached to said hub at said first end thereof, a plurality of receiving means for receiving the bottom end of a respective one of the plurality of legs, said plurality of receiving means corresponding in number to said plurality of arms, each of said plurality of receiving means being attached to said second end of a respective one of said plurality of arms, a plurality of casters each being attached to a respective one of said plurality of arms adjacent a respective one of said plurality of receiving means, and a footrest railing being simultaneously attached to and supported by said plurality of receiving means, whereby when the piano is being supported by said dolly with the bottom end of each of the plurality of legs being received by a respective one of said plurality of receiving means, persons gathered around the piano can rest their feet on said footrest railing; and a sing-along piano bar for use with a piano, said sing-along piano bar including a counter top having a top surface and a bottom surface, a plurality of braces each having a back surface and a top surface perpendicular to said back surface thereof, each of said plurality of braces being attached to said bottom surface of said counter top along said top surface of each of said plurality of braces, and a plurality of brackets corresponding in number to said plurality of braces, each of said plurality of brackets being attached to a respective one of said plurality of braces at said back surface thereof, each of said plurality of brackets being dimensioned and configured to hook around the top of the vertical wall, whereby said sing-along piano bar can be removably mounted to the vertical wall of the sound box of the piano on the outside thereof, and persons gathered around said piano are able to rest at least any combination of food, refreshments, and their body parts on said counter top when said sing-along piano bar is mounted to the vertical wall of the sound box of the piano.

8. The accessory kit according to claim 7, wherein said plurality of arms extend essentially radially from said hub and lie essentially in a single plane, said plain having a top side and a bottom side, and said plurality of casters extend from said plurality of arms on said bottom side of said plane.

9. The accessory kit according to claim 8, wherein each of said plurality of receiving means includes a bottom spaced apart from said plane on said bottom side thereof, said bottom being dimensioned and configured to support the bottom end of one of the plurality of legs, a first sidewall extending from said second end of a respective one of said plurality of arms to said bottom, and a second sidewall extending from said bottom to said footrest railing.

10. The accessory kit according to claim 9, wherein said footrest railing surrounds the plurality of legs, and said footrest railing is shaped to essentially follow the characteristic contour of the sound box of the piano.

11. The accessory kit according to claim 10, wherein each of said plurality of arms includes a first portion and a second portion, said second portion being slidably supported by said first portion, said second portion having a stud attached thereto, said first portion having a slot and said stud passing through said slot in said first portion, and a wing nut threadably engageable with said stud, whereby each of said plurality of arms can be adjusted in length by sliding said second portion relative to said first portion and said second portion can be fixed in a predetermined position relative to said first portion by tightening said wing nut on said stud before said footrest railing is fixed in place.

12. The accessory kit according to claim 11, wherein said counter top is in the form of a strip having a predetermined width and following the characteristic contour of the sound box of the piano in plan view.

13. The accessory kit according to claim 11, wherein each of said plurality of brackets has a first bracket portion attached to a respective one of said plurality of braces, said first bracket portion contacting said back surface of said respective one of said plurality of braces along its entirety, a second bracket portion extending perpendicularly from said first bracket portion from an end of said first bracket portion proximate said counter top in a direction opposite said counter top, and a third bracket portion extending from said second bracket portion at an end thereof distal from said first bracket portion in a direction parallel to said first bracket portion and away from said counter top, whereby said piano bar can be removably hung on to the vertical wall of the sound box of the piano when said second bracket portion of each of said plurality of brackets is fitted across the top of the vertical wall of the sound box of the piano.

14. The accessory kit according to claim 13, wherein said counter top is in the form of a strip having a predetermined width and following the characteristic contour of the sound box of the piano in plan view.

15. The accessory kit according to claim 13, wherein each of said plurality of braces has a pair of parallel spaced apart lateral surfaces on either side of said top and said back surface thereof, and an ornamented front surface extending from said top surface to said back surface thereof.

* * * * *